(12) United States Patent
Vorontsov et al.

(10) Patent No.: US 7,197,248 B1
(45) Date of Patent: Mar. 27, 2007

(54) ADAPTIVE CORRECTION OF WAVE-FRONT PHASE DISTORTIONS IN A FREE-SPACE LASER COMMUNICATION SYSTEM AND METHOD

(75) Inventors: Mikhail A. Vorontsov, Laurel, MD (US); Gary W. Carhart, Elkton, MD (US); John W. Gowens, II, Ellicott City, MD (US); Jennifer C. Ricklin, Laurel, MD (US)

(73) Assignee: United States of America As Represented By The Secretary Of The Army, Washington, DC (US)

( * ) Notice: Subject to any disclaimer, the term of this patent is extended or adjusted under 35 U.S.C. 154(b) by 541 days.

(21) Appl. No.: 10/206,347

(22) Filed: Jul. 29, 2002

(51) Int. Cl.
*H04B 10/00* (2006.01)
(52) U.S. Cl. ...................... 398/119; 398/128
(58) Field of Classification Search ................ 398/119, 398/123, 122, 128, 129–131
See application file for complete search history.

(56) References Cited

U.S. PATENT DOCUMENTS

| | | | | |
|---|---|---|---|---|
| 5,276,636 | A * | 1/1994 | Cohn | 359/561 |
| 5,859,728 | A * | 1/1999 | Colin et al. | 359/561 |
| 6,721,510 | B2 * | 4/2004 | Graves et al. | 398/129 |
| 2002/0027661 | A1 * | 3/2002 | Arieli et al. | 356/512 |

OTHER PUBLICATIONS

Yenice, Yusuf E., Evans, Barry G., *Adaptive, beam-size control for ground to satellite laser communications*, SPIE vol. 3266, University of Surrey, 1998, pp. 221-230.

Barbier et al., *Performance Improvement of a laser communication link incorporating adaptive optics*, SPIE vol. 3432, Jul. 1998, pp. 93-102.

Levine et al, *Horizontal line-of-sight turbulence over near-ground paths and implications for adaptive optics corrections in laser communcations*, Applied Optics, vol. 37, No. 21, Jul. 20, 1998, pp. 4553-4560.

Levine et al., *Active compensation for horizontal line of sight turbulence over near ground paths*, SPIE vol. 3433, San Diego, California, Jul. 1998, pp. 221-232.

Tyson, Robert K., *Adaptive optics and ground-to-space laser communications*, Applied Optics, vol. 35, No. 19, Jul. 1, 1996, pp. 3640-3646.

(Continued)

*Primary Examiner*—Jason Chan
*Assistant Examiner*—Quan-Zhen Wang
(74) *Attorney, Agent, or Firm*—William V. Adams

(57) ABSTRACT

An adaptive free-space laser communication system and a method of communication between laser communication transceivers of the system. Communication channel condition information communicated via laser beams transmitted between a first laser communication transceiver and a second laser communication transceiver is monitored and the information is shared between the transceivers. A wave-front phase of the laser beams is shaped with wave-front correctors of the first and second laser communication transceivers.

3 Claims, 1 Drawing Sheet

OTHER PUBLICATIONS

Plett, et al., *Measurement error for a Shack-Hartmann wavefront sensor in strong scintillation conditions*, SPIE vol. 3433, San Diego, California, Jul. 1998, pp. 211-220.

Muller, et al., *Real-time correction of atmospherically degraded telescope images through image sharpening*, Journal of the Optical Society of America, vol. 64, No. 9, Sep. 1994, pp. 1200-1210.

Vorontsov et al., *Image quality criteria for an adaptive imaging system based on statistical analysis of the speckle field*, J. Opt. Soc. Am. A, vol. 13, No. 7, Jul. 1996, pp. 1456-1466.

Vorontsov et al., *Adaptive optics based on analog parallel stochastic optimization: analysis and experimental demonstration*, J. Opt. Soc. Am. A, vol. 17, No. 8, Aug. 2000, pp. 1440-1453.

Vorontsov et al., *Adaptive Imaging system for phase-distorted extended source and multiple-distance objects*, Applied Optics, vol. 36, No. 15, May 20, 1997, pp. 3319-3328.

Vorontsov et al, *Stochastic parallel-gradient-descent technique for high-resolution wave-front phase-distortion correction*, J. Opt. Soc. Am. A., vol. 15, No. 10, Oct. 1998, pp. 2745-2758.

Vorontsov et al., *Adaptive phase-distortion correction based on parallel gradient-descent optimization*, Optics Letters, vol. 22, No. 12, Jun. 15, 1997, pp. 907-909.

Vorontsov, Mikhail A., *Decoupled stochastic parallel gradient descent optimization for adaptive optics: integrated approach for wave-front sensor information fusion.* J. Opt. Soc. Am. A vol. 19, No. 2 Feb. 2 p. 356-368.

* cited by examiner

ADAPTIVE CORRECTION OF WAVE-FRONT PHASE DISTORTIONS IN A FREE-SPACE LASER COMMUNICATION SYSTEM AND METHOD

STATEMENT OF GOVERNMENT INTEREST

The invention described herein may be manufactured, used and/or licensed by or for the United States government.

BACKGROUND OF THE INVENTION

1. Field of the Invention

This invention relates generally to laser communication systems and methods and more particularly to duplex free-space laser communication systems and methods.

2. Description of the Related Art

Random variations in the refractive index, commonly referred to as atmospheric or optical turbulence, significantly limit the performance of free-space laser communication systems. Optical turbulence-induced random phase and intensity fluctuations (scintillations) across the received wave-front lead to intensity fading at the receiver, with the result being increased system bit error rates. Attempts have been made at applying some type of adaptive optics correction scheme to reduce the effects of optical turbulence on free-space laser communication systems. Adaptive optical systems that have previously been used for free-space laser communication require direct measurement of the wave-front phase using wave-front sensors such as a Shack-Hartmann sensor or shearing interferometer, followed by some type of wave-front reconstruction and conjugation. Disadvantageously however, in the presence of the strong phase and intensity fluctuations characteristic of near-earth propagation paths, these types of systems perform poorly.

DETAILED DESCRIPTION

Figure 1:
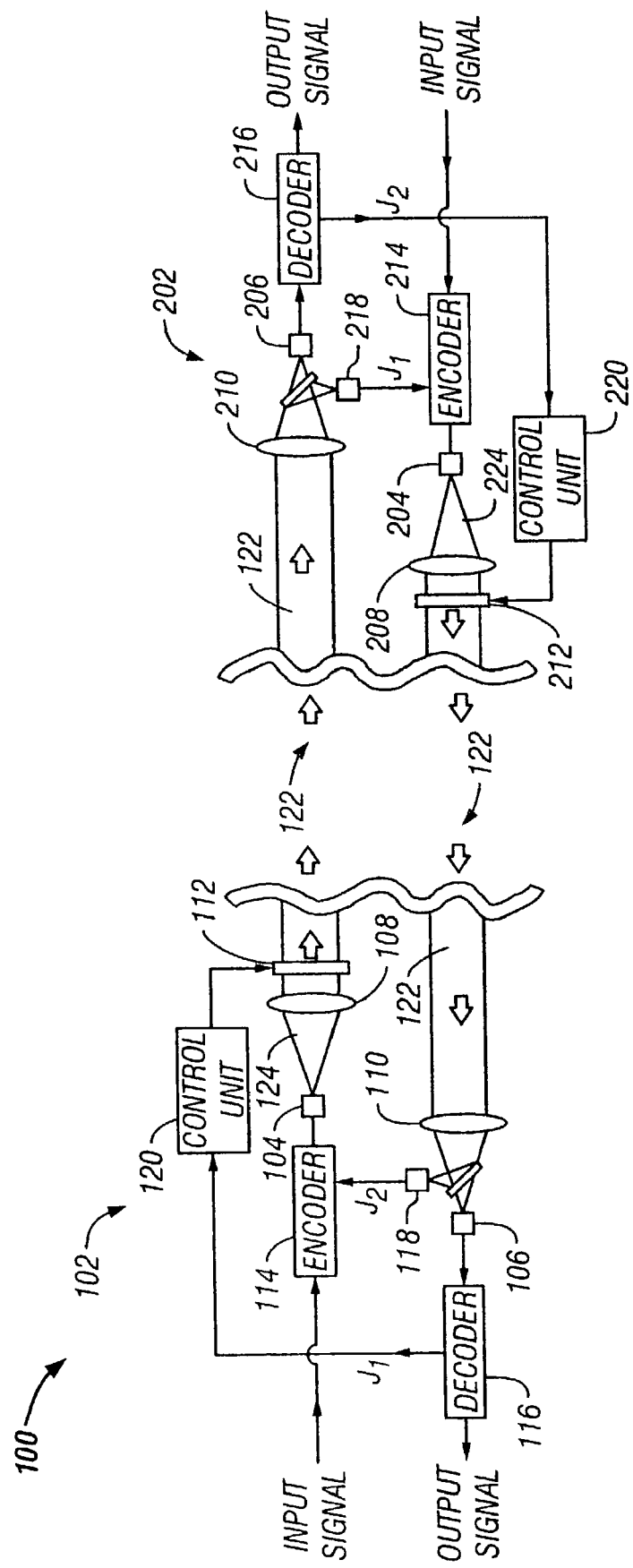
FIG. 1 is a schematic illustration of a full duplex free-space laser communication system with exemplary laser communication transceivers.

The following describes a novel approach to monitoring the atmospheric channel during communication, and to sharing this channel condition information between two free-space laser communication transceivers operating in duplex (two-way) mode for adaptive compensation of atmospheric turbulence-induced distortions. As will be shown below, improvements in the ability to point (direct) and focus (lock) a laser beam in a duplex free-space laser communication system are made. The resulting beam position stabilization and improved beam focusing reduces system bit error rates due to optical turbulence, offering more robust and reliable free-space laser communication system performance and the potential for increased communication distances.

Referring to FIG. 1, a schematic diagram of an adaptive duplex free-space laser communication system 100 comprising two laser communication transceivers 102, 202 is shown. In one example, the two transceiver modules 102, 202 are identical. In the exemplary embodiment shown in FIG. 1, first laser communication transceiver 102 comprises: a laser transmitter 104; photo-receiver 106; transmitter optics (collimating telescope) 108; receiver telescope (focusing lens) 110; wave-front corrector (deformable mirror or liquid crystal spatial light modulator) 112; encoder 114; decoder 116; beam quality image (BQM) 118; and control unit 120. In the example of FIG. 1, the second laser communication transceiver 202 comprises: laser transmitter 204; photo-receiver 206; transmitter telescope (collimating lens) 208; receiver telescope (focusing lens) 210; wave-front corrector (deformable mirror or liquid crystal spatial light modulator) 212; encoder 214; decoder 216; beam quality imager (BQM) 218; and control unit 220.

The following description of laser communication system 100 operation applies regardless of whether transmission is from first laser communication transceiver 102 to second laser communication transceiver 202, or vice versa. The following description refers to an example embodiment where information is sent through optical communication channel 122 from transceiver 102 to transceiver 202. In another example, such as in actual practice both processes of communication can and would occur simultaneously: information being sent from transceiver 102 to transceiver 202, and vice versa.

An improved ability to direct and focus the information-carrying laser beam 124 transmitted from transceiver 102 is achieved through continuous shaping of the wave-front phase of the outgoing beam 124 by the wave-front corrector 112. In this example, the wave front corrector is positioned immediately in front of laser transmitter telescope 108. The wave-front phase of the transmitted laser beam 124 from laser communication transceiver 102 is continuously shaped based upon the measured value of the beam quality metric $J_1$, determined at beam quality imager 218 of the second transceiver 202. This beam quality metric contains information about phase and/or intensity distortions along the optical communication channel 122 between transceiver 102 and transceiver 202. A signal describing the instantaneous value of the beam quality metric $J_1$ is measured at transceiver 202 and is then returned as part of the overall laser communication link signal to the control unit 120 of the other transceiver, in this case transceiver 102. This is accomplished by modulating the laser beam 224 transmitted from transceiver 202 with an encoded signal that is then sent, and subsequently received, by both the photo-receiver 106 and the beam quality metric imager 118 in transceiver 102. In this example, photo-receiver 106 and beam quality metric imager 118 are located at the same or conjugate planes with respect to the receiver telescope 110 of transceiver 102. The beam quality metric imager 118 measures information about distortions (phase and/or intensity) along the optical communication channel between transceiver 202 and transceiver 102. This information, contained in beam quality metric $J_2$, is then returned as part of the overall laser communication link signal to be received by transceiver 202 and subsequently control wave-front corrector 212 in front of the beam 224 transmitted by transceiver 202. The beam quality metric information received from one transceiver (such as transceiver 202) is used to control the wave-front corrector of the partner transceiver (such as wave-front corrector 112 of transceiver 102) using a model-free (blind) optimization algorithm. In general, the purpose of the beam quality metric imagers 118, 218 is to produce the signals $J_2$, $J_1$ that characterize the concentration of laser beam energy onto the respective photo-receivers 106, 206.

The concentration of laser energy onto the photo-receivers 106, 206 is affected by turbulence-induced phase fluctuations along the optical communication channel: strong fluctuations reduce the concentration of energy onto the photo-receivers 106, 206 due to focusing and pointing errors, and signal fading due to scintillation. The notation $J_i$ (i=1,2) is used to designate the signals that contain information about the value of the beam quality metric received from the other transceiver. For example, the beam quality metric $J_1$ shown in transceivers 102 and 202 characterizes the intensity distribution of the laser beam 124 emitted by laser transmitter 104, after propagation through the optical communication channel, as measured by beam quality imager 218 at transceiver 202 and then encoded by encoder 214 into the signal sent by transceiver 202 to be subsequently received by the decoder 116 in transceiver 102.

Criterion dependent on the intensity distribution I(x,y) registered in the focal plane of the receiver (x,y) may selectively be used as the beam quality metric J. For purposes of illustration provided as an example:

$$J = \int_D I^n(x, y)\,dx\,dy$$

where n=1,2, ... is an integer and D is the aperture of the beam quality metric imager, defined here by either 118 or 218. Implementations for measuring the beam quality metric J in the receiver plane may include (1) photocurrent of a photo-receiver (avalanche photo-detector, pin-diode etc.) or a function dependent on photo-receiver output signal (in this case both the beam splitter and beam quality imager in FIG. 1 are not required); (2) incident light power transmitted through an optical fiber placed in the plane of the photo-receiver; (3) energy incident onto a photo-receiver after being passed through a pinhole (energy inside pinhole); or (4) any technique for measuring intensity onto a receiver and computing the beam quality metric dependent on this intensity.

Information about the current state of the beam quality metric $J_1$ as registered by the beam quality imager 218 or directly by a photo-sensor (located in a plane equivalent to that of the photo-receiver 206) is employed to shape the wave-front phase of the beam before it is transmitted from transceiver 102. The beam quality metric $J_1$ measured in transceiver 202 is accordingly transmitted back to transceiver 102 where it can be used to control wave-front corrector 112 with the goal of improving subsequent reception at photo receiver 206.

For example, shaping of the wave-front phase may be accomplished as follows. As previously explained, information concerning the value of the beam quality metric $J_1$ dependent on the laser intensity emitted from laser transmitter 104 that is incident on photo-receiver 206 is encoded by the encoder 214, of transceiver 202, into the signal transmitted from transceiver 202 to transceiver 102. The decoder 116 in transceiver 102 extracts the information of the beam quality metric $J_1$. This information is delivered to the control unit 120 of transceiver 102 which utilizes a model-free optimization technique (for example, gradient descent/ascent, stochastic parallel perturbation gradient descent optimization, decoupled stochastic gradient descent, genetic optimization, etc.) to compute the control signals to be applied to the wave-front corrector 112 of transceiver 102. These output control signals applied to the wave-front corrector 112 modulate (shape) the wave-front phase of the beam 124 before it is transmitted through the optical communication channel to transceiver 202. A successful wave-front phase spatial shaping should to the maximum extent possible attempt to negate the effects of any phase distortions due to inhomogeneities in the refractive index along the optical communication channel. That is, the wave-front phase modulation applied by the wave-front corrector (112, 212) should be a two-dimensional spatial phase map computed to compensate the negative influence of phase distortions along the propagation path even in the possible presence of intensity scintillations typical of laser beam propagation through an optically non-homogeneous media. As the value for the beam quality metric $J_1$ is continuously updated, the control unit 120 continuously operates to optimize this value by updating the output signals to the wave-front corrector 112 in transmitter 102. This in turn continuously shapes the phase of the transmitted beam 124 to counter the effect of phase distortions along the optical channel. Reducing wave-front phase distortions reduces errors in pointing, focusing and signal fading due to scintillation, resulting in increased energy onto the photo-receiver 206 at transceiver 202 and reduced bit error rates.

Feedback circuits implementing a model-free optimization technique are used to continuously optimize the beam quality metric value measured by beam quality imagers (118, 218). This is accomplished by sending signals to adjust either a wave-front phase modulator or an adaptive mirror (deformable or pixelated) placed directly in front of the transmitter (104, 204). The modulated beam emitted by the transmitter (104, 204) passes through the wave-front corrector to obtain a wave-front phase modulation that reduces the effects of turbulence-induced phase distortions in the optical communication channel.

After reading the foregoing specification, one of ordinary skill will be able to effect various changes, substitutions of equivalents and various other aspects of the present invention as broadly disclosed herein. It is therefore intended that the protection granted hereon be limited only by the definition contained in the appended claims and equivalents thereof.

Having thus shown and described what is at present considered to be the preferred embodiment of the present invention, it should be noted that the same has been made by way of illustration and not limitation. Accordingly, all modifications, alterations and changes coming within the spirit and scope of the present invention are herein meant to be included.

We claim:

1. A full duplex method of communicating in a free-space laser communication system comprising the steps of:
   measuring beam quality metric information from laser beams transmitted between a first laser communication transceiver and a second laser communication transceiver of the free-space laser communication system, in the absence of a wavefront sensor;
   sharing the beam quality metric information between the first and second laser communication transceivers of the free-space laser communication system;
   controlling wave-front correctors incorporated into both the first and second laser communication transceivers with the beam quality metric information received by using beam quality metric information received from the second transceiver to drive a blind optimization algorithm that controls the wave-front corrector of the first transceiver; and
   shaping the wave-front phase of the laser beams transmitted between the first and second laser communication transceivers of the free-space laser communication system by the wave-front correctors.

2. A full duplex method of communicating in a free-space laser communication system comprising the steps of:

measuring beam quality metric information from laser beams transmitted between a first laser communication transceiver and a second laser communication transceiver of the free-space laser communication system, in the absence of a wavefront sensor;

sharing the beam quality metric information between the first and second laser communication transceivers of the free-space laser communication system wherein the step of sharing further comprises the following steps:

encoding the beam quality metric information obtained from a beam quality metric imager of the first laser communication transceiver into a data stream transmitted by the first laser communication transceiver;

decoding the beam quality metric information obtained from the beam quality metric imager of the first laser communication transceiver from a data stream received by the second laser communication transceiver;

controlling wave-front correctors incorporated into both the first and second laser communication transceivers with the beam quality metric information received; wherein said step of controlling further comprises the following steps:

locating a photo-receiver and the beam quality metric imager of the first laser communication transceiver at conjugate planes with respect to a receiver telescope of the first laser communication transceiver;

capturing intensity distribution incident on the beam quality metric imager of the first laser communication transceiver;

computing the beam quality metric from the captured intensity distribution incident on the beam quality metric imager of the first laser communication transceiver; and using beam quality metric information received from the first transceiver to drive a blind optimization algorithm that controls the wave-front corrector of the second transceiver; and shaping the wave-front phase of the laser beams transmitted between the first and second laser communication transceivers of the free-space laser communication system by the wave-front correctors.

3. The method of claim 2 in which the step of shaping further comprises continuously shaping the wave-front phase with the wave-front corrector of a laser transmitter of the second laser communication transceiver.

* * * * *